Patented Apr. 30, 1946

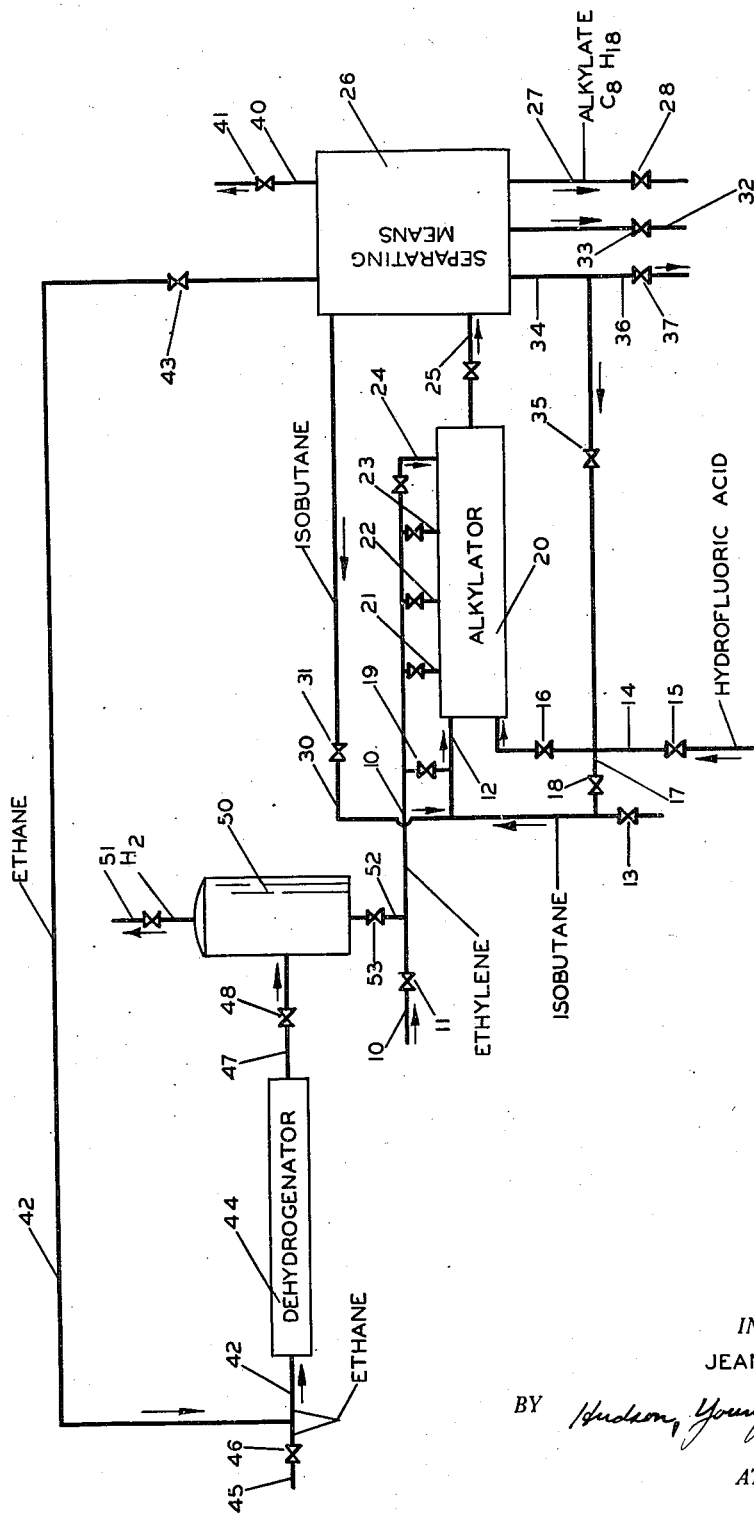

2,399,353

UNITED STATES PATENT OFFICE 2,399,353

ALKYLATION PROCESS

Jean P. Jones, Bartlesville, Okla., assignor to Phillips Petroleum Company, a corporation of Delaware Application December 4, 1942, Serial No. 467,871

5 Claims. (Cl. 260—683.4)

This invention relates to the production of hydrocarbons which are normally liquid. One modification relates particularly to the production of isoparaffin hydrocarbons of high octane number boiling in the motor fuel range from lower boiling isoparaffin hydrocarbons, particularly from isobutane and/or isopentane.

It is well known in the art, at this time, to react low boiling paraffins and olefins by what are known as alkylation reactions to form higher boiling paraffin hydrocarbons. Although the mechanism of such reaction is not clearly known or understood, it appears that such reactions primarily involve a juncture between olefin and paraffin to form paraffins having a number of carbon atoms per molecule which represents the sum of the carbon atoms per molecule of the paraffin and the olefin reactants. Thus, isooctanes are obtained by reacting butenes and a butane or by reacting propylene and a pentane, and isononanes are obtained by reacting a butene and a pentane. Such reactions can be carried out at elevated temperatures and pressures in the absence of catalysts or may be carried out in the presence of catalysts at temperatures from below atmospheric temperature to temperatures approaching and overlapping those employed in non-catalytic processes. It appears that the temperature reaction conditions should be such that the paraffin will undergo only a very slow decomposition by itself and the olefin will tend to undergo a polymerization reaction with itself. The alkylation will be promoted by maintaining high paraffin-olefin ratio. Among the catalysts which are suitable for promoting such alkylation reactions can be included synthetic silica-alumina type catalysts, so-called solid phosphoric acid catalysts, liquid phosphoric acid, hydrofluoric acid, sodium chloro-aluminate and similar compounds with other halogens and/or with other alkali metals, aluminum chloride, aluminum bromide, zinc chloride, zinc bromide, chloro-sulphonic acid, sulfuric acid, etc.

It has been found that when an olefin and an isoparaffin are intimately contacted with some alkylation catalysts such as hydrofluoric acid at temperatures somewhat above those normally used to effect an alkylation reaction involving these hydrocarbons, such as is described above, the resulting paraffins of higher molecular weight do not have the characteristics which one would predict from the addition of the olefin to the paraffin but rather the product appears to result solely from the low boiling isoparaffin, and it further appears that the olefin has been hydrogenated rather than reacted by an alkylation reaction. Thus, at temperatures of the order of 50 to 100° F., propylene will react with isobutane to form heptanes, but at temperatures of the order of 150° F. or higher, substantial amounts of isooctanes are formed, together with a more or less molecular equivalent amount of propane. The exact mechanism of such reaction which gives such products is not known at this time, but it appears that two atoms of hydrogen are transferred from one or both of two molecules of the low boiling isoparaffin to the olefin, and the two isoparaffins, or residues, unite to form a higher boiling isoparaffin.

It has now been found that the latter reaction is facilitated by having present a hydrogenating material such as finely divided nickel, iron, or cobalt, particularly when a low boiling olefin such as propylene or ethylene enters into the reaction. I have also found that high yields of normally liquid paraffin hydrocarbons in the motor fuel boiling range are obtained from lower boiling isoparaffins by reacting them in the presence of hydrofluoric acid and in the presence of an olefin having a fewer number of carbon atoms per molecule than the isoparaffin, removing from effluents of such a reaction a paraffin which has been formed from the low boiling olefin, subjecting said paraffin to dehydrogenation to regenerate the olefin, and recycling the regenerated olefin to the alkylation step. This process can be carried out with particular efficiency when ethylene is the olefin since the resulting ethane is readily separated from the alkylation product, and can subsequently be dehydrogenated to regenerate ethylene in simple inexpensive equipment with high efficiency and with a minimum loss to undesired by-products in the dehydrogenating reaction.

It is an object of this invention to produce normally liquid hydrocarbons.

It is a further object of this invention to produce paraffin hydrocarbons boiling in the motor fuel range from lower boiling paraffin hydrocarbons.

Another object of this invention is to produce isoparaffin hydrocarbons boiling in the motor fuel range primarily only from lower boiling isoparaffin hydrocarbons.

Further objects and advantages of my invention will become obvious to one skilled in the art from the accompanying disclosure and discussion.

Reference will now be made to the accompanying drawing which forms a part of this specification and which illustrates diagrammatically by means of a flow sheet one arrangement of apparatus suitable for practicing my invention in a preferred form, the said discussion serving also to exemplify the invention.

A low boiling isoparaffin, such as isobutane, is passed to alkylator 20 through line 12 controlled by valve 13. Isobutane may be replaced by or accompanied by other low boiling isoparaffins, particularly isopentane or 2-methyl pentane. A suitable low boiling olefin, preferably lower boiling than the isoparaffin, is introduced through line 10, controlled by valve 11, and may be introduced entirely or in part through valve 19 to the isoparaffin stream passing through line 12 into alkylator 20, or may be introduced in part or entirely at a plurality of points in the alkylation zone as through one or more of valve-controlled lines 21, 22, 23 and 24. Hydrofluoric acid is introduced through line 14 controlled by valve 15 and may be passed directly through valve 16 to the alkylator 20 or may be passed entirely or in part through line 17 controlled by valve 18 to line 12 for admixture with the entering isoparaffin. Although in some instances the alkylation may take place, in the presence only of hydrofluoric acid, preferably in the liquid phase, as the catalytic material, it is preferred to operate also in the presence of finely divided hydrogenating material such as finely divided nickel. Such a hydrogenating material may be present as a stationary mass in the alkylation zone, as when finely divided nickel is present in a bed of supporting material such as charcoal, silica-gel, alumina, and the like, or it may be present as a mobile suspension, as when finely divided nickel is suspended in liquid hydrofluoric acid introduced into alkylator 20. The pressure in alkylator 20 is preferably such as to maintain hydrofluoric acid, and at least a substantial amount of the hydrocarbon material, in liquid phase at the reaction temperature. The reaction temperature is preferably substantially above 100° F., preferably between about 150 and about 350° F. It is also preferable that sufficient hydrofluoric acid be present to form an acid phase separate from the hydrocarbon phase, and that the two phases be intimately intermixed. The reaction time should be such that most of the olefin material introduced to the reaction zone disappears as such, and the reaction time and temperature should be so correlated that the major part of the olefin material which is introduced appears in the effluents from alkylator 20 as the corresponding paraffin material. It will generally be impossible to prevent minor amounts of olefin from reacting directly with isoparaffin present, but in the practice of this invention in its most preferred form it is desired to keep such direct alkylation reactions at a minimum. The reaction may take place either in a tube coil or in an enlarged reaction vessel with internal or external recycle of an unseparated portion of the reaction mixture, or in any other manner such as is known to the art in conventional alkylation systems. It is preferred that the concentration of added unreacted olefin be kept at a low value during the reaction and that the reaction be permitted to go to a substantial amount of completion by continuous addition of olefin during the reaction period as reaction takes place. It is also preferred that appreciably more than half of the low boiling isoparaffins present remain unreacted and generally it will be found desirable to have only between about 5 and about 20% of the isoparaffin reacted.

Effluents of the alkylator 20 are passed through a line 25 to a separating means 26 which will include suitable fractionators, heaters, pumps, coolers, condensers, separators and the like as can be readily supplied by one skilled in the art to effect the necessary separations for any particular application of my invention. An alkylate fraction comprising normally liquid isoparaffins produced in the process is recovered as a product through line 27 controlled by valve 28. Heavier hydrocarbons may be discharged through a line 32 controlled by valve 33. Unreacted low boiling isoparaffins may be recycled to alkylator 20 through line 30 controlled by valve 31. Catalytic material may be removed through a line 34 and preferably is recycled at least in part through valve 35 to alkylator 20. A part or, if desired, all of the catalytic material may be discharged from the system for regeneration or the like through line 36 controlled by valve 37. Undesired low boiling material may be discharged through line 40 controlled by valve 41. A low-boiling paraffin material corresponding to the olefin material charged through line 10 is removed through line 42 and passed through valve 43 to a dehydrogenator 44. Generally it will be desirable to introduce a corresponding paraffin material to dehydrogenator 44 from an outside source through line 45 controlled by a valve 46. The material added through line 45 may be added only in minor amounts or may be added to the exclusion of olefins added through valve 11 and line 10. In any event the sum of the material added through line 45 and through line 10 and valve 11 should be such as to make up the loss in the added olefinic material to side reactions in alkylator 20 and dehydrogenator 44. In dehydrogenator 44 paraffins charged are subjected to dehydrogenation conditions of temperature and pressure such that major reaction is a conversion of paraffin to a corresponding olefin with a minimum of breaking of carbon to carbon bonds. With a low boiling paraffin such as ethane and/or propane, this dehydrogenation may be carried out in the absence of catalysts with a satisfactory conversion to the corresponding olefins, but even with these paraffins and with the higher boiling paraffins it is preferable to use a suitable dehydrogenating catalyst with corresponding lower dehydrogenating temperatures and with more clean cut dehydrogenation. When dehydrogenating ethane to ethylene in the absence of a catalyst the dehydrogenation temperature is preferably between about 1300 and 1600° F. In the presence of a catalyst it may be lowered to between about 1100 to 1250° F., and with paraffins of higher molecular weight temperatures between about 800 and 1050° F. may be successfully employed. A dehydrogenating pressure of the order of 5 to 30 pounds per square inch absolute is preferred and when subatmospheric pressures are used it is preferable to have a diluent present such as steam, nitrogen, methane and the like. The reaction time in dehydrogenator 44 should be such that the effluent contains about 15 to 30 mol per cent of olefin. The effluent is passed through line 47 and valve 48 to a separating means 50 wherein a separation is effected between hydrogen, which is discharged from the system through valve 51, and desired olefins. Separating means 50 may also include suitable means for effecting the concentration of olefins by separation from the corresponding paraffin to at least a substantial extent in which case the paraffins may be returned to dehydrogenator 44 by means not shown. Olefins are passed to line 10 and alkylator 20 through line 52 controlled by valve 53.

As an example of the operation of my invention, ethylene may be reacted with isobutane in the presence of an excess of liquid, substantially anhydrous hydrofluoric acid containing suspended, finely divided nickel. The reaction temperature is maintained in the neighborhood of about 290° F., the reactants are maintained in a state of intimate liquid mixture, and ethylene is added to the reacting mixture as reaction proceeds, a total amount of ethylene being added equivalent to one mol for every ten mols of isobutane. Effluents of the reaction zone are passed to a separator for separation of hydrocarbon from catalyst, the hydrocarbon material is fractionated to remove ethane, formed in the reaction in substantial amounts, minor amounts of hydrofluoric acid, unreacted isobutane, and a normally liquid alkylate fraction boiling below 400° F. and containing about 20 per cent hexanes, about 55 per cent octanes, and the rest other paraffin hydrocarbons of lower, intermediate, and higher molecular weights, formed by side reactions, said alkylate representing about 16 mol per cent of the isoparaffin charged.

Many modifications and variations of this invention may obviously be used and can be adapted by one skilled in the art without departing from the spirit of the disclosure. It will be understood that the flow diagram is schematic, that only essential pieces of equipment and conditions have been described, and the function and modifications are discussed in sufficient detail to serve as sufficient guides.

I claim:

1. A process for the production of normally liquid isoparaffins from lower boiling isoparaffins, which comprises contacting a low-boiling isoparaffin and ethylene with liquid concentrated hydrofluoric acid and finely divided nickel as the essential catalytic material at a reaction temperature between about 150 and about 350° F. and such that conversion of said isoparaffins to higher-boiling isoparaffins and concomitant conversion of the major part of said ethylene to ethane takes place, separating from effluents of said reaction higher boiling isoparaffins so formed as products of the process, separating also ethane so formed, subjecting said ethane to dehydrogenation at a dehydrogenation temperature and pressure to form ethylene, and passing said ethylene so formed to said first reaction step together with additional amounts of low-boiling isoparaffin.

2. A process for the production of normally liquid isoparaffins from lower boiling isoparaffins which comprises contacting a low-boiling isoparaffin and ethylene with liquid concentrated hydrofluoric acid and finely divided nickel as the essential catalytic material at a reaction temperature between about 150 and about 350° F. and such that conversion of said isoparaffins to higher-boiling isoparaffins and concomitant conversion of the major part of said ethylene to ethane takes place, and separating from effluents of said reaction higher boiling isoparaffins so formed as products of the process.

3. A process for the production of normally liquid paraffinic hydrocarbons from lower boiling hydrocarbons, which comprises reacting a low-boiling alkylatable paraffin and a lower-boiling olefin hydrocarbon in the presence of liquid concentrated hydrofluoric acid and a hydrogenating material of the group consisting of finely divided nickel, iron and cobalt at an elevated temperature between about 150 and about 350° F. and under reaction conditions such that reaction between said olefin and said paraffin is a minor reaction and such that reaction of said paraffin to form a higher-boiling paraffin and concomitant hydrogenation of said low boiling olefin to the corresponding low-boiling paraffin is a major reaction, passing hydrocarbon effluents of said reaction to a separating means, separating therefrom a fraction comprising higher-boiling paraffins so produced as a product of the process, separating also said low-boiling paraffin formed in said process, passing said low-boiling paraffin to a dehydrogenation step and effecting a dehydrogenation thereof to form olefins, recovering said olefins and returning same along with additional low-boiling paraffins to the first said reaction step.

4. A process for the production of normally liquid paraffinic hydrocarbons from lower boiling hydrocarbons, which comprises reacting a low-boiling alkylatable paraffin and a lower-boiling olefin hydrocarbon in the presence of liquid concentrated hydrofluoric acid and finely divided nickel as the sole catalytic material at an elevated temperature between about 150 and about 350° F. and under reaction conditions such that reaction between said olefin and said paraffin is a minor reaction and such that reaction of said paraffin to form a higher-boiling paraffin and concomitant hydrogenation of said low boiling olefin to the corresponding low-boiling paraffin is a major reaction, passing hydrocarbon effluents of said reaction to a separating means, separating therefrom a fraction comprising higher-boiling paraffins so produced as a product of the process, separating also said low-boiling paraffin formed in said process, passing said low-boiling paraffin to a dehydrogenation step and effecting a dehydrogenation thereof to form olefins, recovering said olefins and returning same along with additional low-boiling paraffins to the first said reaction step.

5. An improved process for converting isobutane to octanes, which comprises contacting isobutane in substantial molar excess and ethylene with a catalytic material consisting of liquid concentrated hydrofluoric acid and finely divided nickel at a reaction temperature between about 150 and 350° F. and such that isobutane is converted to octanes and such that the major part of the ethylene is converted to ethane, separating from effluents of said reaction a normally liquid fraction comprising octanes so produced, separating also from said effluents said ethane so produced, subjecting said ethane to dehydrogenation at a dehydrogenation temperature and pressure to regenerate ethylene, and passing said ethylene so regenerated to said first reaction together with additional amounts of isobutane.

JEAN P. JONES.